United States Patent
Hosomi et al.

(10) Patent No.: US 12,049,011 B2
(45) Date of Patent: Jul. 30, 2024

(54) ROBOT CONTROL DEVICE, ROBOT CONTROL METHOD, AND RECORDING MEDIUM STORING ROBOT CONTROL PROGRAM

(71) Applicant: OMRON Corporation, Kyoto (JP)

(72) Inventors: Shinichi Hosomi, Kyoto (JP); Akane Nakashima, Nara (JP); Akihiro Suzumura, Berkeley, CA (US); Ryoichi Kuratani, Kizugawa (JP); Takeshi Kojima, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 320 days.

(21) Appl. No.: 17/275,311

(22) PCT Filed: Nov. 27, 2019

(86) PCT No.: PCT/JP2019/046325
§ 371 (c)(1),
(2) Date: Mar. 11, 2021

(87) PCT Pub. No.: WO2020/149020
PCT Pub. Date: Jul. 23, 2020

(65) Prior Publication Data
US 2022/0032460 A1 Feb. 3, 2022

(30) Foreign Application Priority Data
Jan. 15, 2019 (JP) .................. 2019-004310

(51) Int. Cl.
*B25J 9/16* (2006.01)
(52) U.S. Cl.
CPC .......... *B25J 9/1666* (2013.01); *B25J 9/1607* (2013.01); *B25J 9/1638* (2013.01); *B25J 9/1651* (2013.01)

(58) Field of Classification Search
CPC ...... B25J 9/1666; B25J 9/1607; B25J 9/1638; B25J 9/1651; G05B 2219/39178;
(Continued)

(56) References Cited

U.S. PATENT DOCUMENTS 6,684,128 B1 * 1/2004 Tounai .................. B25J 9/1638
318/568.22
9,764,471 B2 * 9/2017 Sugio ..................... B25J 9/1664
(Continued)

FOREIGN PATENT DOCUMENTS

CN 101823260 A 9/2010
JP H07-266267 A 10/1995
(Continued)

OTHER PUBLICATIONS

Extended European Search Report issued in related European Patent Application No. 19910125.4 dated Aug. 31, 2022.
(Continued)

*Primary Examiner* — Jason Holloway
(74) *Attorney, Agent, or Firm* — Morgan, Lewis & Bockius LLP

(57) ABSTRACT

A robot control device includes: a first acquisition unit to acquire path information relating to a path of a robot and speed information relating to a speed the robot moves on the path; a second acquisition unit to acquire specification information relating to a specification of the robot; a determination unit to determine a segment where an action time of the robot is shortened even when a waypoint is added on the path; a correction unit to correct the path of the robot so as to make inertia of the robot smaller in a segment where an action time of the robot is shortened; a computation unit to compute a load acting on a joint of the robot; and an adjustment unit to adjust a control amount for controlling an
(Continued)

acceleration of the robot joint such that the load computed by the computation unit satisfies a target load.

5 Claims, 19 Drawing Sheets

(58) Field of Classification Search
CPC .......... G05B 2219/41123; G05B 2219/43046; G05B 2219/43099
See application file for complete search history.

(56) References Cited

U.S. PATENT DOCUMENTS

| | | | |
|---|---|---|---|
| 2005/0127686 A1* | 6/2005 | Akinfiev | ................. F16H 21/42 |
| | | | 292/201 |
| 2014/0067118 A1* | 3/2014 | Gomi | ..................... B25J 9/1651 |
| | | | 901/9 |
| 2014/0297030 A1 | 10/2014 | Iwasaki | |
| 2014/0297031 A1 | 10/2014 | Iwasaki | |
| 2016/0271799 A1 | 9/2016 | Sugio | |
| 2019/0375100 A1* | 12/2019 | Yoshizawa | ............. B25J 9/1661 |

FOREIGN PATENT DOCUMENTS

| | | |
|---|---|---|
| JP | 2003-136466 A | 5/2003 |
| JP | 2008-194760 A | 8/2008 |
| JP | 2014-161917 A | 9/2014 |
| JP | 2014-193520 A | 10/2014 |
| JP | 2015-054360 A | 3/2015 |
| JP | 2016-040066 A | 3/2016 |
| JP | 2016-043439 A | 4/2016 |
| JP | 2016-172293 A | 9/2016 |
| JP | 6126152 B2 | 5/2017 |
| JP | 6268819 B2 | 1/2018 |
| JP | 2018-065233 A | 4/2018 |
| JP | 2018-069428 A | 5/2018 |

OTHER PUBLICATIONS

Chiddarwar et al., "Optimal trajectory planning for industrial robot along a specified path with payload constraint using trigonometric splines," International Journal of Automation and Control, 6 (1): 39-65 (2012).
International Search Report issued in corresponding International Patent Application No. PCT/JP2019/046325 dated Jan. 28, 2020.
Written Opinion issued in corresponding International Patent Application No. PCT/JP2019/046325 dated Jan. 28, 2020.
Office Action issued in corresponding Chinese Patent Application No. 201980059371.8 dated Dec. 7, 2023 with partial English translation.

* cited by examiner

FIG.7
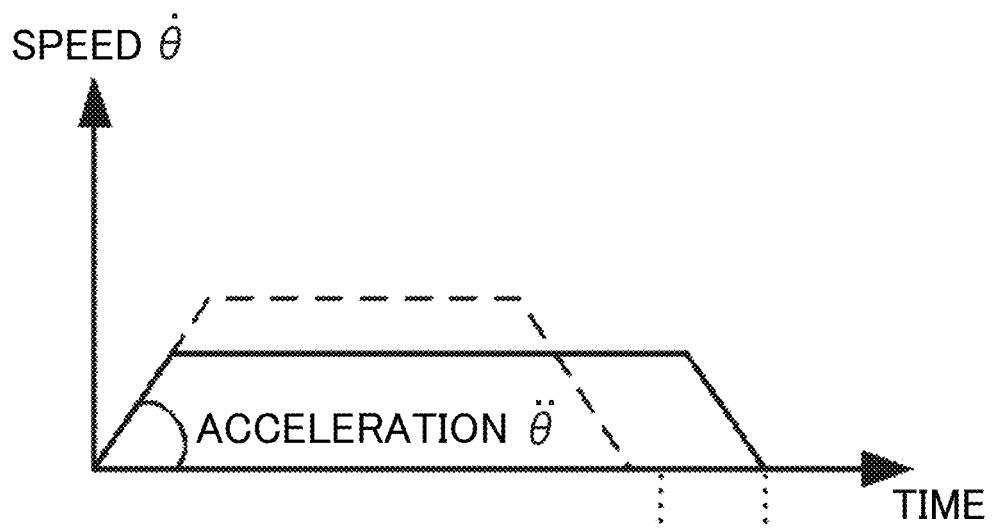
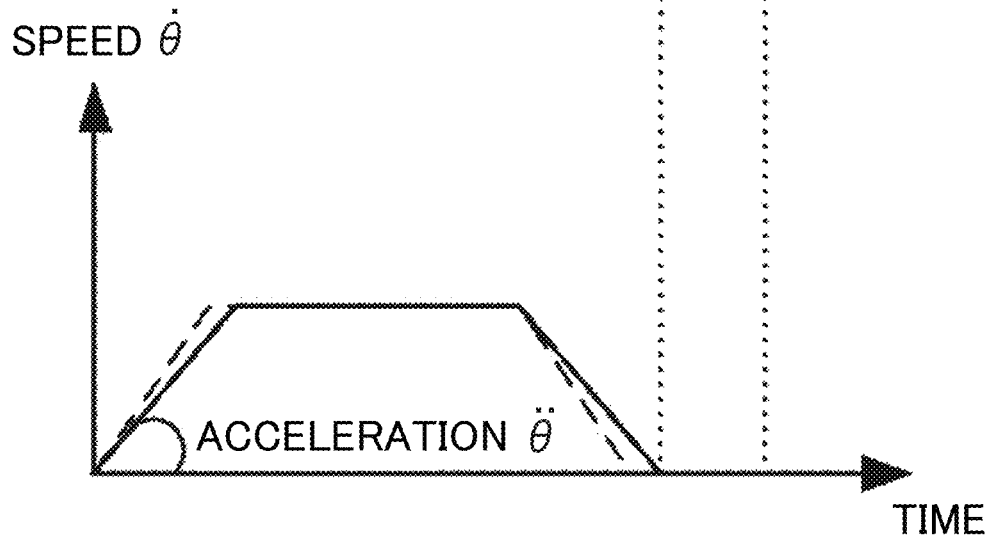

ROBOT CONTROL DEVICE, ROBOT CONTROL METHOD, AND RECORDING MEDIUM STORING ROBOT CONTROL PROGRAM

TECHNICAL FIELD

The present invention relates to a robot control device, a robot control method, and a robot control program.

BACKGROUND ART

As technology for robot trajectory generation, Patent Document 1 discloses a trajectory generation device for a robot. This robot includes a load determination unit to compare a load applied to a configuration member when the robot performs an action on a reference trajectory against a load determination value, and a speed reduction unit to reduce the speed of the robot in cases in which the load is greater than the load determination value.

Patent Document 2 discloses a trajectory generation method for a multiaxial robot. In order to calculate a speed pattern using Bobrow's method, a speed pattern for the greatest speed is found using both left and right hand systems for a robot arm form by performing a calculation to convert positions on a trajectory into angles, instead of being limited to either the left hand system or the right hand system of a robot arm.

PRIOR ART DOCUMENTS

Patent Documents

Patent Document 1: Publication of Japanese Patent No. 6126152
Publication of Patent Document 2: Japanese Patent No. 6268819

SUMMARY OF INVENTION

Technical Problem

In order to implement actions of a robot at high speed, manual adjustment has been required to acceleration, a parameter related to robot action, based on either taught points or waypoints generated using a path plan. In such manual adjustment, parameters that shorten Takt time without imparting excessive load to the robot need to be found by trial and error, and this effort results in a significant burden on the user. In particular, the effort for making adjustments becomes very large in cases in which there are many variations of taught points or waypoints generated using a path plan, making it difficult to find the optimum acceleration in every case.

In consideration of the above circumstances, an object of the present invention is to provide a robot control device, a robot control method, and a robot control program capable of adjusting a control amount to control acceleration of a robot to achieve high speed actions of the robot, irrespective of the skill level of a user.

Solution to Problem

A first aspect of the disclosure is a robot control device including a first acquisition unit, a second acquisition unit, a determination unit, a correction unit, a computation unit, and an adjustment unit. The first acquisition unit is configured to acquire path information relating to a path of a robot and speed information relating to a speed the robot moves on the path. The second acquisition unit is configured to acquire specification information relating to a specification of the robot. The determination unit is configured to determine a segment where an action time of the robot is shortened even when a waypoint is added on the path based on the path information, the speed information, and the specification information. The correction unit is configured to correct the path of the robot so as to make inertia of the robot smaller in a segment where an action time of the robot is shortened based on the path information, the speed information, and the specification information. The computation unit is configured to compute a load acting on a joint of the robot on a corrected path based on the path information, the speed information, and the specification information. The adjustment unit is configured to adjust a control amount for controlling an acceleration of the robot joint such that the load computed by the computation unit satisfies a target load.

The first aspect described above may be configured such that the first acquisition unit acquires obstacle information relating to an obstacle, the determination unit determines whether or not the robot would interfere with the obstacle based on the obstacle information, and in cases in which determination has been made that the robot would interfere with the obstacle, the correction unit re-corrects the robot path such that the robot will not interfere with the obstacle.

The first aspect described above may be configured to further include a path generation unit configured to acquire pose information relating to an initial pose and a target pose of the robot and obstacle information relating to an obstacle, and to generate the path information and the speed information based on the pose information, the obstacle information, and the specification information that have been acquired.

The first aspect described above may be configured such that the determination unit determines for a segment determined to have a shorter action time of the robot whether or not a segment for which the path is correctable is included, and the correction unit corrects the path only for segments determined to be segments for which the path is correctable.

The first aspect described above may be configured such that the determination unit compares a first action time of the robot computed from a speed profile expressed by the speed information against a second action time of the robot computed from a combined profile resulting from combining speed profiles expressed by speed information of each of segments resulting from dividing the path by adding a waypoint, and determines the path to be segments giving rise to shorter action times of the robot in cases in which the second action time is shorter than the first action time.

A second aspect of the disclosure is a robot control method in which a computer executes processing including a first acquisition process, a second acquisition process, a determination process, a correction process, a computation process, and an adjustment process. The first acquisition process acquires path information relating to a path of a robot and speed information relating to a speed of the robot moving on the path. The second acquisition process acquires specification information relating to a specification of the robot, a determination process of determining a segment where an action time of the robot is shortened even when a waypoint is added on the path based on the path information, the speed information, and the specification information. The correction process corrects the robot path so as to make inertia of the robot smaller in a segment where an action time of the robot is shortened based on the path information, the speed information, and the specification information. The computation process computes a load acting on a joint of the robot based on the path information, the speed information, and the specification information. The adjustment process adjusts a control amount for controlling an acceleration of the robot joint such that the load computed by the computation process satisfies a target load.

A third aspect of the disclosure is a robot control program that causes a computer to function as a first acquisition unit, a second acquisition unit, a determination unit, a correction unit, a computation unit, and an adjustment unit. The first acquisition unit is configured to acquire path information relating to a path of a robot and speed information relating to a speed the robot moves on the path. The second acquisition unit is configured to acquire specification information relating to a specification of the robot. The determination unit is configured to determine a segment where an action time of the robot is shortened even when a waypoint is added on the path based on the path information, the speed information, and the specification information. The correction unit is configured to correct the path of the robot so as to make inertia of the robot smaller in a segment where an action time of the robot is shortened based on the path information, the speed information, and the specification information. The computation unit is configured to compute a load acting on a joint of the robot based on the path information, the speed information, and the specification information. The adjustment unit is configured to adjust a control amount for controlling an acceleration of the robot joint such that the load computed by the computation unit satisfies a target load.

Advantageous Effects

The present invention enables control amounts to control acceleration of a robot to be adjusted such that the robot performs action at high speed irrespective of the skill of the user.

BRIEF DESCRIPTION OF DRAWINGS

FIG. 7 is a diagram illustrating changes in Takt time for a case in which speed is reduced and for a case in which acceleration is reduced.

DESCRIPTION OF EMBODIMENTS

Figure 1:
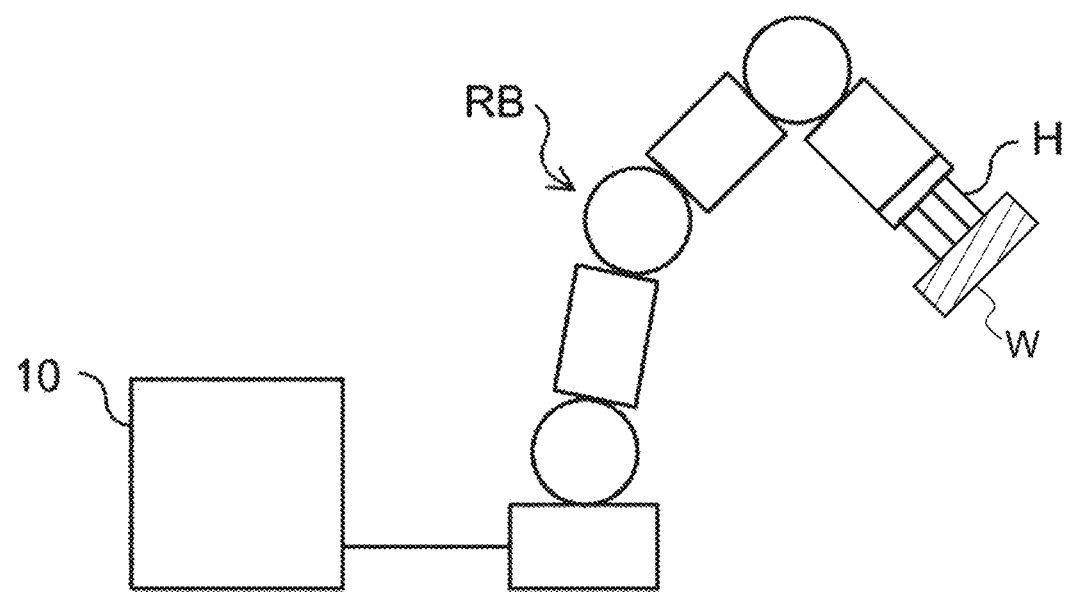
FIG. 1 is a diagram illustrating schematic configuration of a robot and a robot control device.

Explanation follows regarding an example of an exemplary embodiment of the present invention, with reference to the drawings. Note that the same or equivalent configuration elements are appended with the same reference numerals in each of the drawings. The dimensional proportions illustrated in the drawings may be exaggerated in order to aid explanation, and do not necessarily conform to actual proportions.

First Exemplary Embodiment

FIG. 1 is a diagram illustrating schematic configurations of a robot and a robot control device.

As illustrated in FIG. 1, a robot control device 10 is connected to a robot RB, and adjusts parameters (action command values) for when the robot RB performs an action. The robot control device 10 may be incorporated into a control device as one function of the control device for controlling the robot RB. The detailed configuration of the robot control device 10 will be described later.

The robot RB moves so as to follow either plural taught points taught by a user or plural waypoints generated from a path plan. The robot RB follows various action command values to move. The various action command values include, for example, speed, acceleration, deceleration, and rotation angles of joints of the robot RB. The robot RB moves so as to follow the action command values as adjusted by the robot control device 10. Explanation follows regarding a case in the present exemplary embodiment in which from out of the action command values it is the control amounts for controlling the acceleration of the robot RB that are adjusted. Note that since deceleration is simply negative acceleration, adjustment of acceleration also encompasses adjustment of deceleration.

As an example, a robot hand H is attached to a distal end of the robot RB as an end effector. In this case, for example the robot RB is what is referred to as a pick-and-place robot that grips a workpiece W configuring a manipulation target of the robot RB at a prescribed position, transports the workpiece W to a prescribed destination, and places the workpiece W there. As an alternative example, the robot RB may have a tool attached as an end effector. In such cases, the robot RB moves so as to follow a taught path or a path based on a path plan, and performs prescribed processing such as welding, screw fastening, or inspection at a prescribed location.

Before going on to explain the robot control device 10 in detail, explanation follows regarding a configuration of the robot RB. In the present exemplary embodiment, explanation is given regarding an example in which the robot RB is a vertical articulated robot. However, the present invention is also applicable to a horizontal multi jointed robot (SCARA robot), a parallel link robot, an orthogonal robot, a mobile robot, a flying robot (drone), a humanoid robot, and the like.

Figure 2:
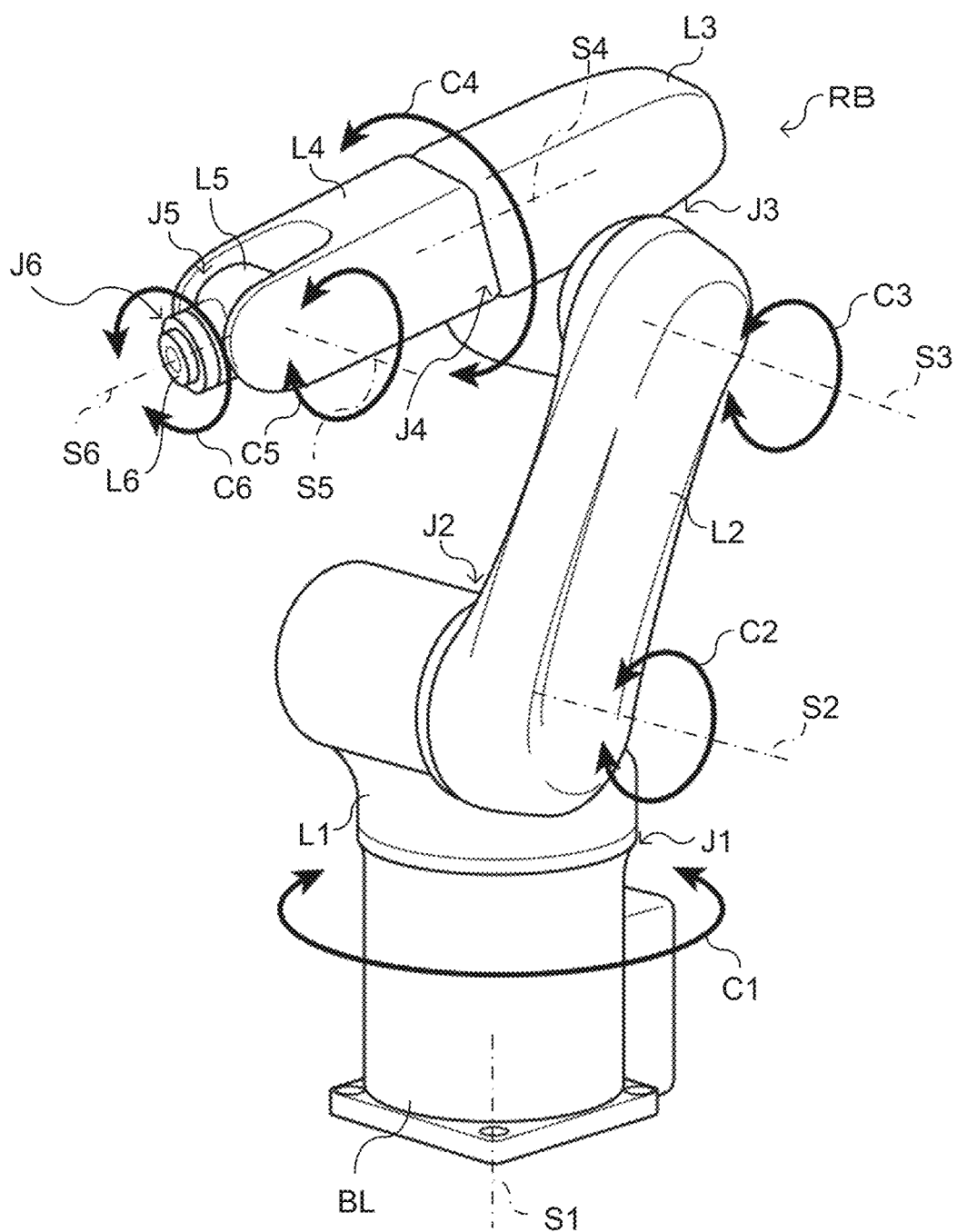
FIG. 2 is a diagram illustrating a configuration of a robot that is a vertical articulated robot.

FIG. 2 is a diagram illustrating a configuration of a robot that is a vertical articulated robot.

As illustrated in FIG. 2, the robot RB is a six-shaft robot with six degrees of freedom, and includes a base link BL, links L1 to L6, and joints J1 to J6. Note that the joints are joints that connect the links together. The joints J1 to J6 connect the respective links together so as to be capable of rotating with respect to each other powered by a non-illustrated motor. Although an example of a six-shaft robot is explained in the present exemplary embodiment, the number of shafts is not limited to six, and there may be any number of two or more shafts. The number of links would also change according to the number of shafts.

The base link BL and the link L1 are connected together through the joint J1 that rotates in the arrow C1 direction about a vertical shaft S1, as illustrated in FIG. 2. The link L1 accordingly rotates in the arrow C1 direction with the base link BL as the support.

The link L1 and the link L2 are connected together through the joint J2 that rotates in the arrow C2 direction about a horizontal shaft S2 in FIG. 2. Accordingly, the link L2 rotates in the arrow C2 direction with the joint J1 as the support.

The link L2 and the link L3 are connected together through the joint J3 that rotates in the arrow C3 direction about a shaft S3 in FIG. 2. The link L3 accordingly rotates in the arrow C3 direction with the joint J2 as the support.

The link L3 and the link L4 are connected together through the joint J4 that rotates in the arrow C4 direction about a shaft S4 in FIG. 2. The link L4 accordingly rotates in the arrow C4 direction with the joint J3 as the support.

The link L4 and the link L5 are connected together through the joint J5 that rotates in the arrow C5 direction about a shaft S5 in FIG. 2. The link L5 accordingly rotates in the arrow C5 direction with the joint J4 as the support.

The link L5 and the link L6 are connected together through the joint J6 that rotates in the arrow C6 direction about a shaft S6 in FIG. 2. The link L6 accordingly rotates in the arrow C6 direction with the joint J5 as the support. Note that although omitted from illustration in FIG. 2, the robot hand H is attached to the link L6.

The joints J1 to J6 are each set with a range of movement over a predetermined rotation angle range.

The position of fingers of the robot RB or the pose of the robot RB are determined by the rotation angles of each of the joints J1 to J6. In cases in which a path is taught to the robot RB, angle values for the rotation angles of each of the joints J1 to J6 are expressed as vectors of a dimension corresponding to the number of shafts of the robot (as six dimension vectors therefore in the present exemplary embodiment), and these vectors are taught in sequence as taught points. Similarly, in cases in which the path is not taught but generated, waypoints for the robot RB to pass through are generated as vectors of a dimension corresponding to the number of shafts of the joints J1 to J6. Note that sometimes vector data including coordinate values in an orthogonal coordinate system are given as an action path instead of vector data including angle values at taught points or waypoints. In such cases, the coordinates values in the orthogonal coordinate system may be converted into angle values of the joints J1 to J6 based on inverse kinematics of the robot.

Next, explanation follows regarding the robot control device 10.

Figure 3:
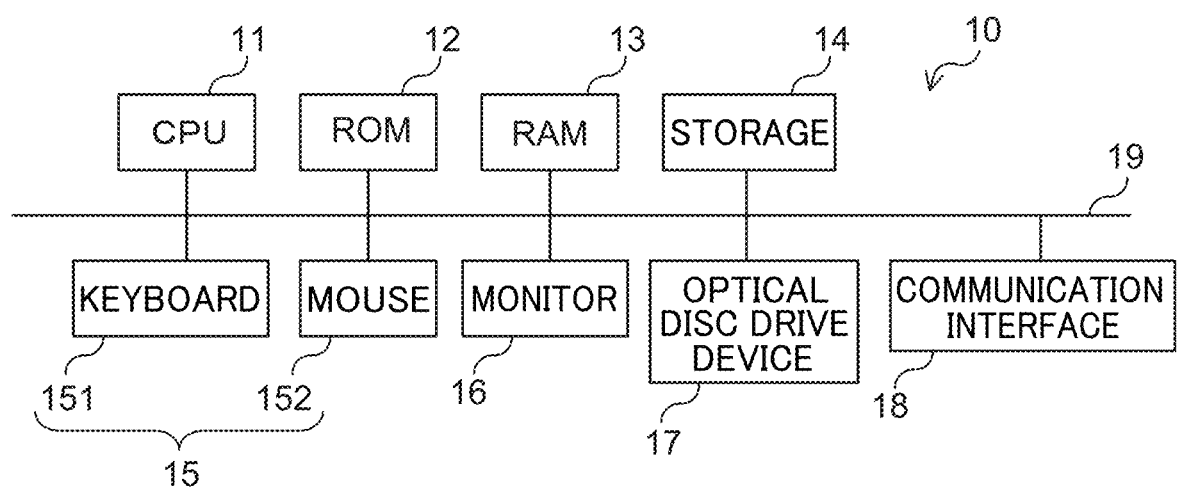
FIG. 3 is a block diagram illustrating a hardware configuration of a robot control device.

FIG. 3 is a block diagram illustrating a hardware configuration of the robot control device 10 according to the first exemplary embodiment.

As illustrated in FIG. 3, the robot control device 10 includes a central processing unit (CPU) 11, read only memory (ROM) 12, random access memory (RAM) 13, storage 14, an input unit 15, a monitor 16, an optical disc drive device 17, and a communication interface 18. The respective configuration elements are connected together through a bus 19 so as to be capable of communicating with each other.

In the present exemplary embodiment, the ROM 12 or the storage 14 is stored with a robot control program for controlling the robot RB. The CPU 11 is a central processing unit that executes various programs and controls various configurations. Namely, the CPU 11 reads the program from the ROM 12 or the storage 14, and executes the program using the RAM 13 as a workspace. The CPU 11 controls the various configuration elements described above and performs various arithmetic processing according to the program recorded in the ROM 12 or the storage 14.

The ROM 12 is stored with various programs and various data. The RAM 13 serves as a workspace to temporarily store programs and data. The storage 14 is configured by a hard disk drive (HDD) or a solid state drive (SSD), and is stored with various programs including an operating system, and various data.

The input unit 15 includes a keyboard 151 and a pointing device such as a mouse 152, and is used to perform various input. The monitor 16 is, for example, configured by a liquid crystal display, and displays various information such as success or failure of workpiece suction. The monitor 16 may also function as the input unit 15 if a touch panel is adopted. The optical disc drive device 17 performs reading of data stored on various recording media (such as CD-ROMs or Blu-ray discs) and writing of data to the recording media.

The communication interface 18 is an interface for communicating with other machines, and may employ a standard such as Ethernet (registered trademark), FDDI, or Wi-Fi (registered trademark).

Next, explanation follows regarding functional configuration of the robot control device 10.

Figure 4:
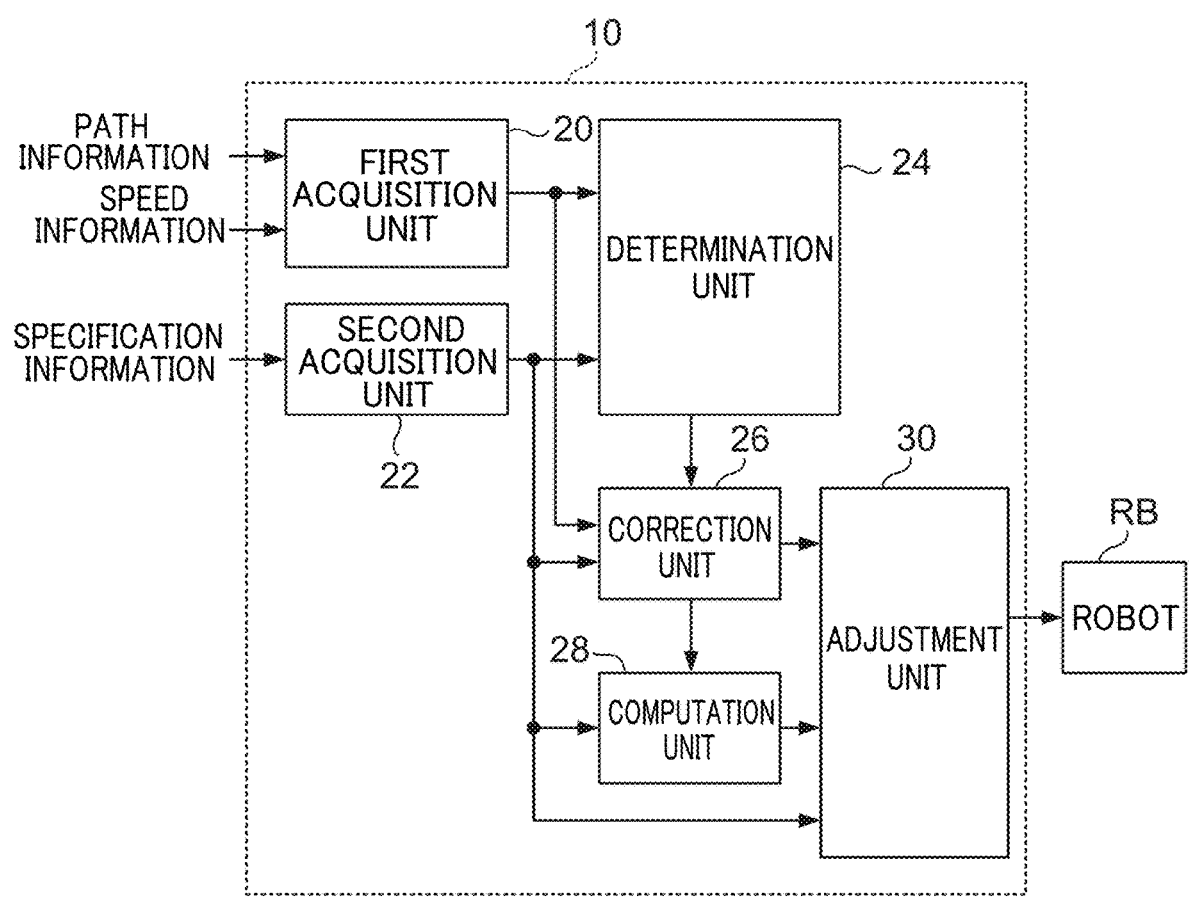
FIG. 4 is a block diagram illustrating an example of a functional configuration of a robot control device according to a first exemplary embodiment.

FIG. 4 is a block diagram illustrating an example of a functional configuration of the robot control device 10.

As illustrated in FIG. 4, a functional configuration of the robot control device 10 includes a first acquisition unit 20, a second acquisition unit 22, a determination unit 24, a correction unit 26, a computation unit 28, and an adjustment unit 30. The respective functional configuration elements are implemented by the CPU 11 reading the robot control program stored in the ROM 12 or the storage 14, expanding the robot control program in the RAM 13, and executing the robot control program.

The first acquisition unit 20 acquires path information relating to a path of the robot RB, and speed information relating to the speed when the robot RB is moving on the path.

The path information is information relating to a path from a freely selected initial pose of the robot RB to a target pose. The path is a list of poses adopted when the robot RB performs an action from the initial pose to the target pose. The pose of the robot RB is determined by the angle values of the rotation angles of the joints J1 to J6, and so the path is configured by a list of angle values for the rotation angles of the joints J1 to J6 at each of the taught points or waypoints of the robot RB from the initial pose to the target pose of the robot RB.

The speed information includes a speed profile expressing changes in speed when the robot RB is performing an action from the initial pose to the target pose. The action of the robot RB follows this speed profile.

The second acquisition unit 22 acquires specification information relating to the specification of the robot RB. The specification information includes information expressing specification such as maximum speed, maximum acceleration, maximum deceleration, angle range of adoptable rotation angles, and the like of each of the joints J1 to J6. The specification information further includes information relating to an equation of motion of the robot RB. The equation of motion is obtained by using a physical model or the like of the robot RB, analyzing the relationship between acceleration of each of the joints J1 to J6 of the robot RB and load acting on the joints J1 to J6 of the robot RB when in motion, and mathematizing the relationship. The equation of motion may also include other factors such as external force acting on the links L1 to L6. Load is related to the mechanical or electrical energy, and includes at least one factor out of torque acting on each of the joints J1 to J6, a rate of change in torque, kinetic energy, and the current or power supplied to the joints J1 to J6. Explanation is given in the present exemplary embodiment regarding an example of a case in which load is taken as being the torque acting on the joints J1 to J6.

Based on the path information, the speed information, and the specification information, the determination unit 24 determines a segment that even with the addition of a waypoint to the path achieves a shorter action time of the robot RB to be an inertia reducible segment. An inertia reducible segment is a segment enabling the inertia of the joints to be reduced.

As will be described in detail later, based on the path information the determination unit 24 for example identifies a segment in which a predetermined joint performs a continuous action, namely a segment without stopping, and sets a waypoint inside the identified segment. The determination unit 24 then computes the speed information, namely the speed profile, for when the waypoint has been set. The determination unit 24 then compares an action time of the robot RB identified from the computed speed profile against an action time of the robot RB identified from the speed profile acquired by the first acquisition unit 20. If the action time of the robot RB for when the waypoint has been set is shorter than the action time of the robot RB as identified from the speed profile acquired by the first acquisition unit 20, then this segment is determined to be an inertia reducible segment in which the action time of the robot RB can shortened even though a waypoint is added on the path.

Based on the path information, the speed information, and the specification information, the correction unit 26 corrects the path of the robot RB so that the inertia of the joints is smaller in the inertia reducible segment as determined by the determination unit 24. Namely, the pose of the robot RB at the waypoint is added to the path.

Based on the path information, the speed information, and the specification information, the computation unit 28 computes the torque acting on the joints of the robot, namely the joints J1 to J6, on the corrected path.

The adjustment unit 30 adjusts control amounts to control the acceleration of the joints J1 to J6 of the robot RB such that the torque on the joints J1 to J6 computed by the computation unit 28 satisfies a target load, namely a target torque. Note that the control amounts are control amounts used to drive motors of each of the joints J1 to J6 of the robot RB. In this example, the control amounts for controlling the acceleration are adjusted based on the specification information so as not to exceed the maximum acceleration or the maximum deceleration. The target torque may be set individually for each of the joints J1 to J6 of the robot RB, or may be set as a common value for the joints J1 to J6. The target torque is decided appropriately according to the specification of the robot RB. For example, the target torque may be a value obtained by subtracting a prescribed margin from an upper limit value of the torque permitted for the joints J1 to J6. The adjustment unit 30 controls the robot RB based on the speed profile obtained for the corrected path with adjusted acceleration.

In this manner, the robot control device 10 adjusts the control amounts used to control acceleration of the robot RB. Adjusting the control amounts to control the acceleration of the robot RB enables the load acting on the joints J1 to J6 to be adjusted more easily than adjusting the speed, and also enables a reduction in Takt time. Explanation follows regarding this point, with reference to FIG. 5 to FIG. 7.

Figure 5:
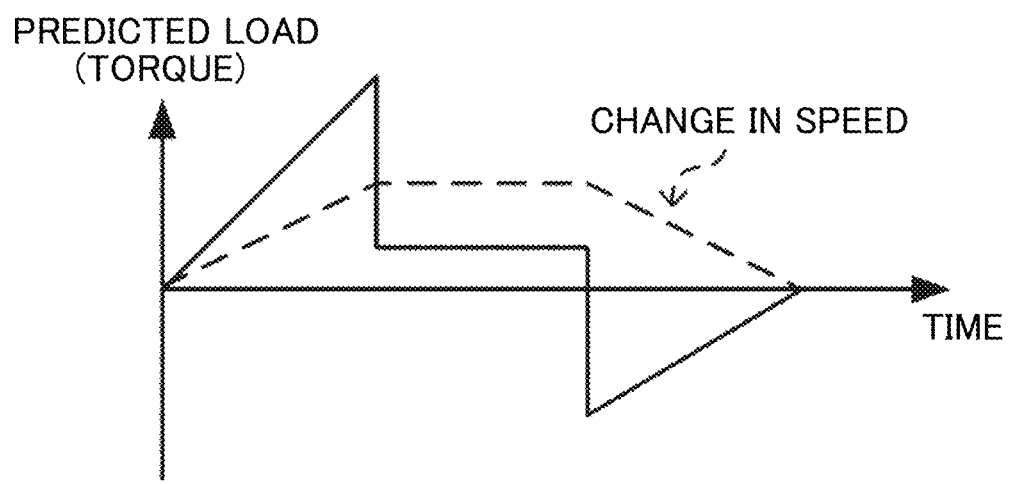
FIG. 5 is a diagram illustrating a relationship between predicted load and changes in rotation speed of a joint.
Figure 6:
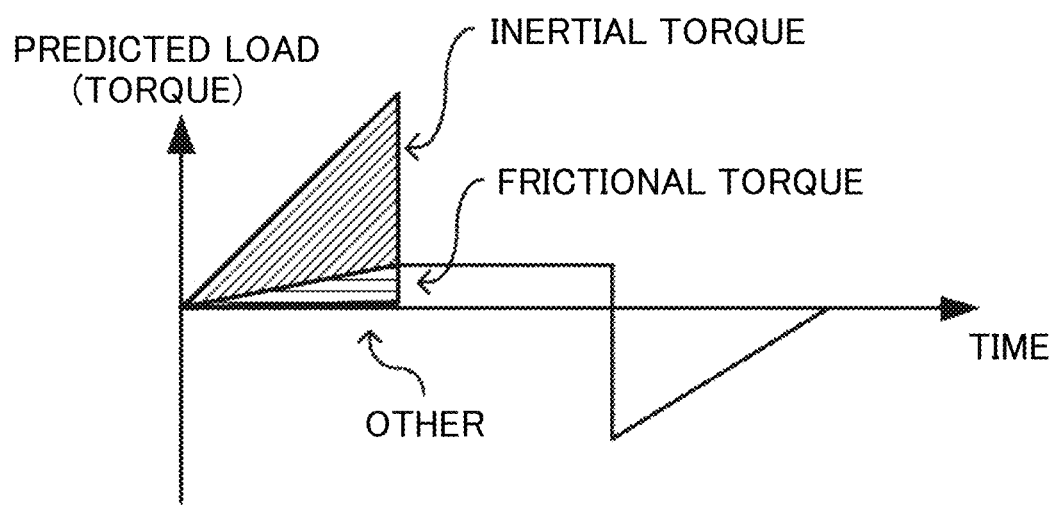
FIG. 6 is a diagram representing a predicted load profile and torque components in the profile.

FIG. 5 is a diagram illustrating a relationship between a predicted load predicted to act on the robot RB and changes to the rotation speed of a joint. FIG. 6 is a diagram illustrating a profile of predicted load and components of torque making up this profile. FIG. 7 is a diagram illustrating a change in Takt time between a case in which speed is reduced and a case in which acceleration is reduced.

The horizontal axis in FIG. 5 represents time, and the vertical axis in FIG. 5 represents the predicted load acting on a joint. In FIG. 5, the change in joint speed is illustrated by a dashed line. As illustrated in FIG. 5, the predicted load increases as the speed increases. The sign of the predicted load inverts when the speed starts to decrease, and then the predicted load increases.

Note that as illustrated in FIG. 6, using the profile of predicted load, the components making up the predicted load may be expressed as inertial torque, frictional torque, and other forces. The inertial torque, frictional torque, and other forces may be expressed by the following equation of motion, wherein τ is the predicted load.

$$\tau = M(\theta)\ddot{\theta} + V(\theta,\dot{\theta}) + F(\dot{\theta}) + G(\theta)$$

τ:Predicted load (torque), M(θ):Matrix on mass

V(θ,θ̇):Torque due to centrifugal force and Coriolis force

F(θ̇):Frictional torque, G(θ):Gravity torque, M(θ)θ̈: Internal torque

Equation (1)

Based on Equation (1) and FIG. 6, the inertial torque is determined by the magnitude of acceleration, and the frictional torque is determined by the magnitude of speed. In particular, as illustrated in FIG. 6, it is clear that inertial torque has a greater effect on the predicted load than the frictional torque. Accordingly, it is not clear whether decreasing speed alone would be effective in reducing inertial torque, and also not clear whether this would result in approaching a target load value. In cases in which the target load or the permitted load value is exceeded by the inertial torque alone, reducing speed alone would not suppress the load to the target load value or below. On the other hand, generally in most cases a target load value or a permitted load value is not exceeded by frictional torque alone. This is because permitted values are also defined for speed in the specification, and so as long as the speed is within the range of permitted values the frictional torque will not exceed the permitted load value. Adjusting acceleration alone accordingly enables the predicted load to be suppressed to the target load.

As described above, from the perspective of the components of load, adjusting control amounts to control the acceleration as in the exemplary embodiment described above is clearly an approach superior to adjusting speed.

Moreover, when a comparison is made between a case in which speed is reduced as in the upper graph in FIG. 7 against a case in which acceleration is reduced as in the lower graph in FIG. 7, the case in which acceleration is reduced is able to reduce load by the same amount even though the rate of change is smaller than in the case in which speed is reduced. Accordingly, even in cases in which the same reduction in load is achieved, reducing the acceleration results in a shorter action time than reducing the speed. As a result, as illustrated in FIG. 7, the case in which adjustments are made to the control amount to control acceleration results in a shorter Takt time than adjusting speed for the same load.

As described above, from the perspective of Takt time, it is clear that adjusting control amounts to control acceleration as in the present exemplary embodiment is an approach superior to adjusting speed.

Next, explanation follows regarding operation of the robot control device 10.

Figure 8:
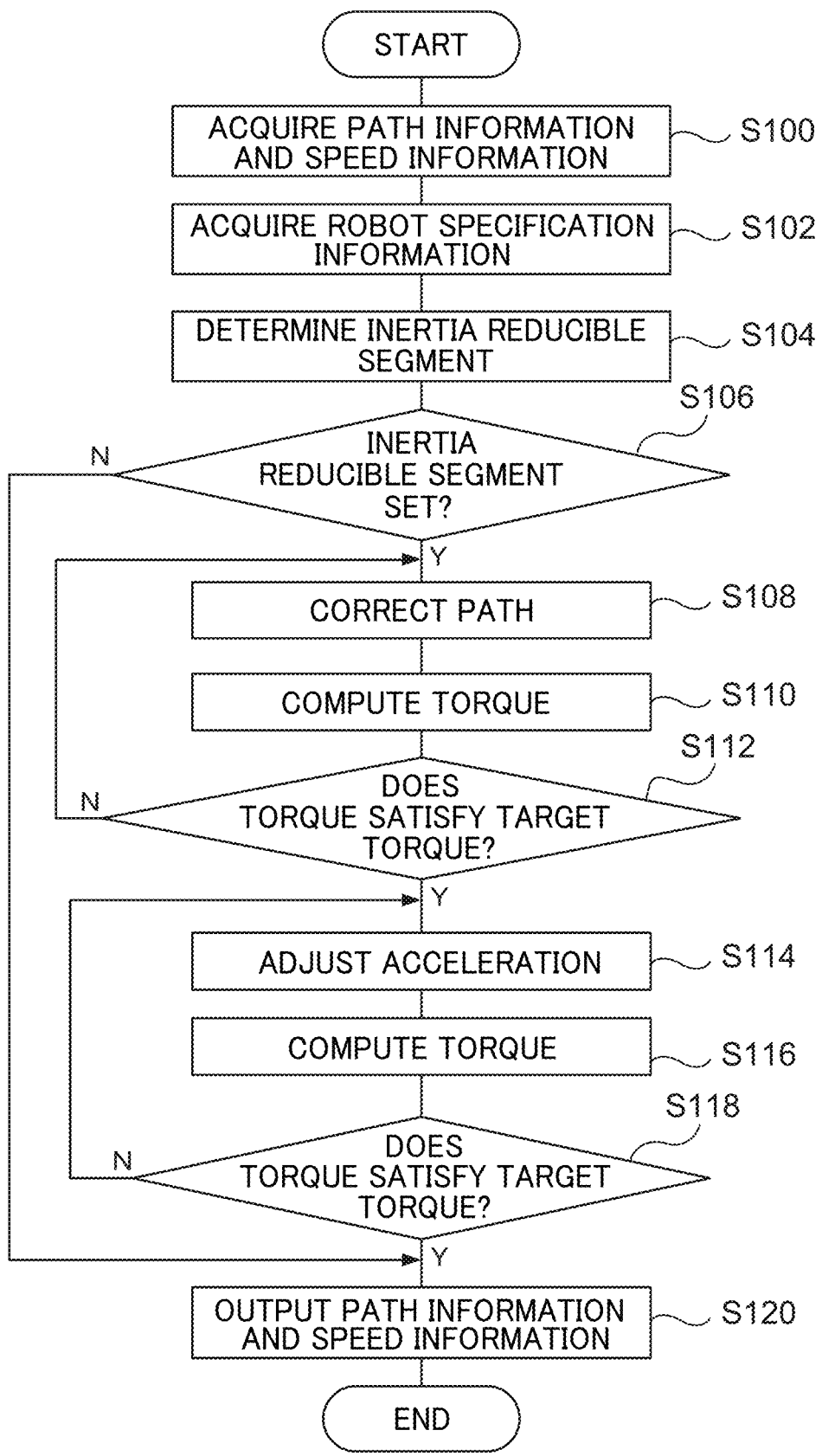
FIG. 8 is a flowchart illustrating a flow of robot control processing by a robot control device according to the first exemplary embodiment.

FIG. 8 is a flowchart illustrating a flow of robot control processing by the robot control device 10. The CPU 11 reads the robot control program from the ROM 12 or the storage 14, expands the robot control program in the RAM 13, and executes the robot control program so as to perform the robot control processing.

Figure 9:
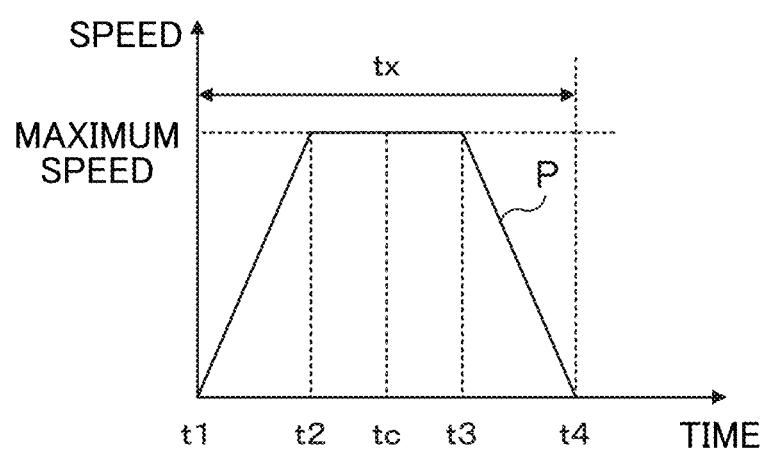
FIG. 9 is a diagram illustrating an example of a speed profile.

The CPU 11 functions as the first acquisition unit 20 to acquire path information relating to a path of the robot RB and speed information relating to a speed when the robot RB moves on the path, namely the speed profile (step S100). FIG. 9 illustrates a speed profile P of the joint J1 as an example. The horizontal axis in FIG. 9 represents time, and the vertical axis in FIG. 9 represents speed. In the example of the speed profile illustrated in FIG. 9, the speed gradually increases from a timing t1 when the robot RB is in the initial pose, and a maximum speed of the joint J1 is maintained from a timing t2 to a timing t3. The speed gradually decreases from the timing t3 until becoming stationary at a timing t4.

The CPU 11 functions as the second acquisition unit 22 to acquire the specification information relating to the specification of the robot RB (step S102). Namely, the CPU 11 acquires information representing the specification of the robot RB such as the maximum speed, maximum acceleration, maximum deceleration, angle range of adoptable rotation angles of each of the joints, and the like, and also acquires information of the equation of motion of the robot RB. The equation of motion includes the parameters of Equation (1) as defined according to the specification of the robot RB.

The CPU 11 functions as the determination unit 24 and, based on the path information, the speed information, and the specification information, determines a segment where an action time of a joint can be shortened even though a waypoint is added on the path to be an inertia reducible segment (step S104). First, based on the path information the determination unit 24 identifies a segment where the joint performs a continuous action, namely a segment without stopping. In the present exemplary embodiment, as an example an action segment where the joint J1 performs a continuous action is identified. In the example of FIG. 9, since the joint J1 performs a continuous action from t1 to t4, the segment from t1 to t4 is identified as the action segment.

Figure 10:
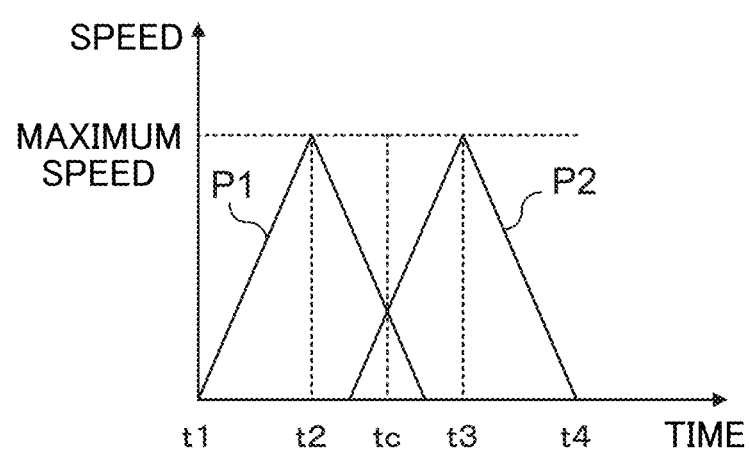
FIG. 10 is a diagram illustrating an example of a speed profile.

Next, an additional waypoint is set. In the present exemplary embodiment, as an example a waypoint is set midway through the action segment of the joint J1. For example, as illustrated in FIG. 9, a waypoint is added at tc midway from t1 to t4. The speed profiles are then computed for each segment of the path divided at the additional waypoint. Specifically, as illustrated in FIG. 10, a first half speed profile P1 and a second half speed profile P2 are computed based on the path information, speed information, and specification information of the robot RB. Note that the profiles of the first half speed profile P1 and the second half speed profile P2 vary according to the maximum speed, maximum acceleration, maximum deceleration and the like included in the specification information of the robot RB.

Figure 11:
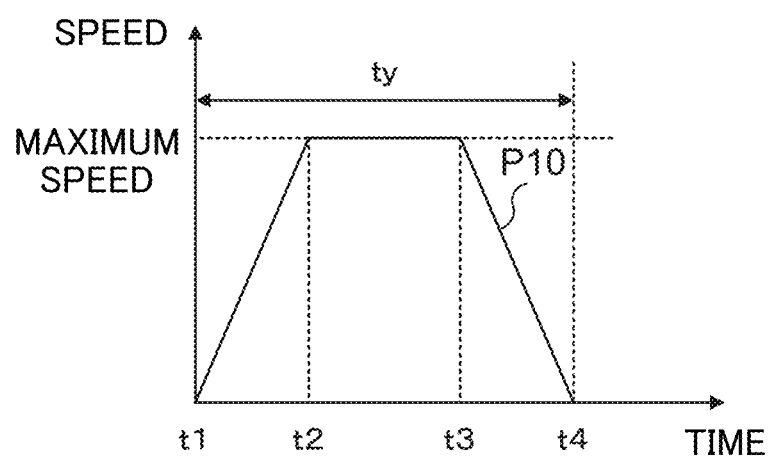
FIG. 11 is a diagram illustrating an example of a speed profile.

As illustrated in FIG. 10, in cases in which a waypoint has been added, sometimes there is an overlap of deceleration and acceleration in a segment including the midway tc. This deceleration and acceleration is wasteful. The first half speed profile P1 and the second half speed profile P2 are accordingly added together to generate a combined profile. A combined profile P10 such as that illustrated in FIG. 11 is generated as a result. The combined profile P10 results in a constant speed for segment t2 to t3, and enables smooth action of the joint J1.

Next, the action time of the joint J1 for the speed profile P illustrated in FIG. 9 as acquired at step S100 is compared against the action time of the joint J1 for the combined profile P10 illustrated in FIG. 11. Namely, a time tx from t1 to t4 in FIG. 9 (a first action time) and a time ty from t1 to t4 in FIG. 11 (a second action time) are compared. In cases in which the action time ty of the joint J1 for the combined profile P10 is less than the action time tx of the joint J1 for the speed profile P acquired at step S100, namely in cases in which the action time of the joint J1 is shorter by adding the waypoint, the path of the joint J1 in the segment from t1 to t4 of the speed profile P acquired at step S100 is set as an inertia reducible segment.

On the other hand, an inertia reducible segment is not set in cases in which the action time ty of the joint J1 for the combined profile P10 is longer than the action time tx of the joint J1 for the speed profile P acquired at step S100, namely in cases in which the action time tx of the joint J1 is longer with the additional waypoint.

Note that in the example of FIG. 11, the maximum speed of the joint J1 is maintained in the segment from t2 to t3, resulting in a speed profile capable of securing sufficient acceleration time even with an additional waypoint. The action time ty for the combined profile P10 in FIG. 11 is the same as the action time tx for the speed profile P in FIG. 9. The path of the joint J1 in the segment from t1 to t4 of the speed profile P acquired at step S100 is accordingly set as an inertia reducible segment.

Figure 12:
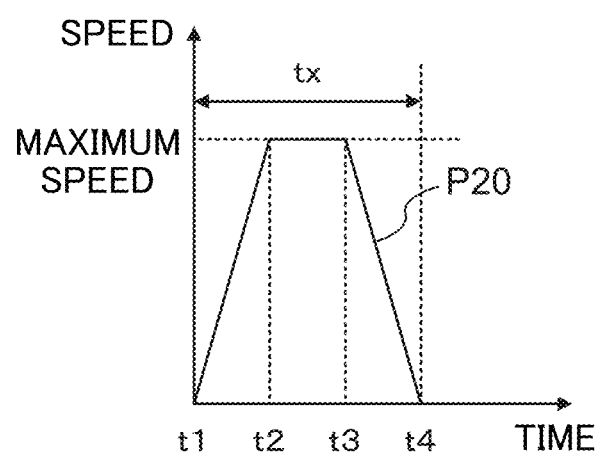
FIG. 12 is a diagram illustrating an example of a speed profile.
Figure 13:
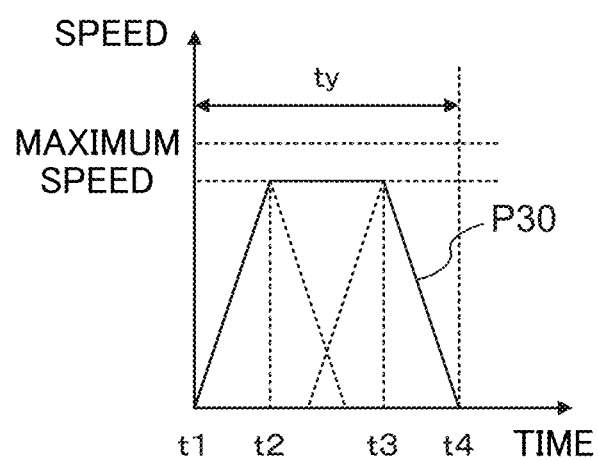
FIG. 13 is a diagram illustrating an example of a speed profile.

Explanation now follows regarding a case in which an inertia reducible segment is not set. Suppose a speed profile of the joint J1 is the speed profile P20 such as that illustrated in FIG. 12. Also suppose that for a speed profile P20 a combined profile is generated by addition of a waypoint, and combined profile P30 is generated as illustrated in FIG. 13. The combined profile P30 is a speed profile in which the maximum speed of the joint J1 is not maintained in the segment from t2 to t3, and a sufficient acceleration time is not able to be secured with an additional waypoint. Moreover, the action time ty in the combined profile P30 in FIG. 13 is longer than the action time tx in the speed profile P20 in FIG. 12. In such cases, the path of the joint J1 in the segment from t1 to t4 of the speed profile P acquired at step S100 is not set as an inertia reducible segment.

The CPU 11 functions as the determination unit 24 to determine whether or not an inertia reducible segment has been set (step S106). Processing transitions to step S108 in cases in which an inertia reducible segment has been set (step S106: YES), and processing transitions to step S120 in cases in which an inertia reducible segment has not been set (step S106: NO).

Note that in cases in which an inertia reducible segment determined to shorten the action time of the robot RB has been set, the determination unit 24 may determine for this inertia reducible segment whether or not a segment is included where the path is correctable, so as to correct the path only for segments determined to be segments for which the path is correctable. Namely, the processing of step S108 onward may be executed only for segments for which path correction is possible, while the processing of step S108 onward is not executed for segments for which path correction is not possible.

Note that segments for which the path is correctable refer to segments where correcting the path by addition of a waypoint would not have a detrimental effect on the action of the robot RB. For example, in cases in which the robot control device 10 is applied to a pick-and-place device, a path from where a workpiece is gripped to a prescribed placement location where the workpiece is carried and placed is divided into three segments. These are a first segment until the workpiece is gripped, a second segment in which the gripped workpiece is carried to the placement location, and a third segment in which the gripped workpiece is placed. It is thought that in such cases, for the second segment, even were a waypoint to be added and the path corrected to achieve a higher speed, this would be a segment having a detrimental effect on the action of the robot RB. On the other hand, the first segment and the third segment include actions in which the robot RB grips the workpiece, places the workpiece, and the like. Thus were an attempt to be made to speed up the first segment or the third segment then this would risk having a detrimental effect on the action of the robot RB, for example due to dropping the gripped workpiece. Accordingly, configuration may be made such that the processing of step S108 onward is only executed for the second segment, and the processing of step S108 onward is not executed for the first segment or the third segment.

Note that segments for which the path is correctable and segments for which the path is not correctable may be set in advance, or may be set by a user.

Figure 14:
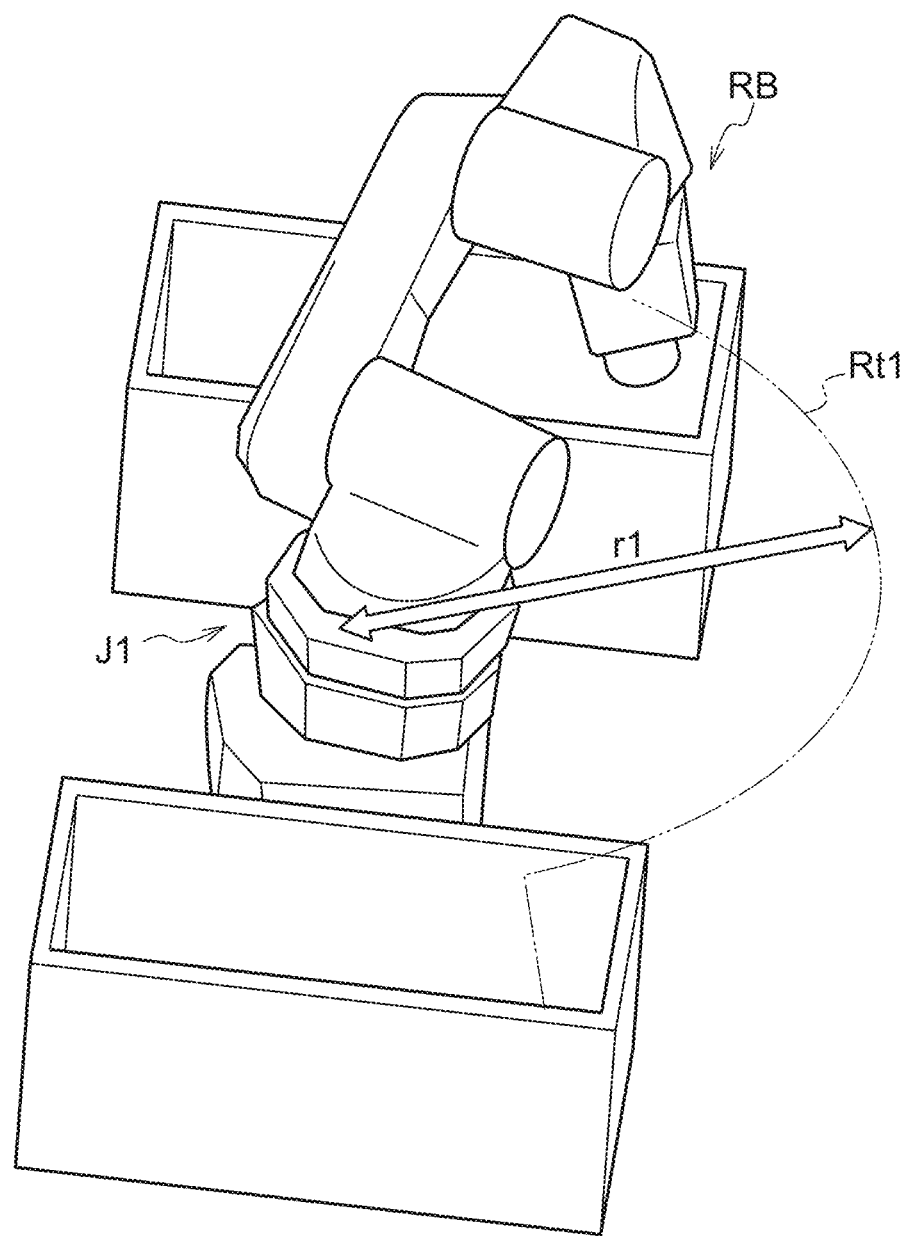
FIG. 14 is a diagram to explain a path in a case in which a waypoint is not added.
Figure 15:
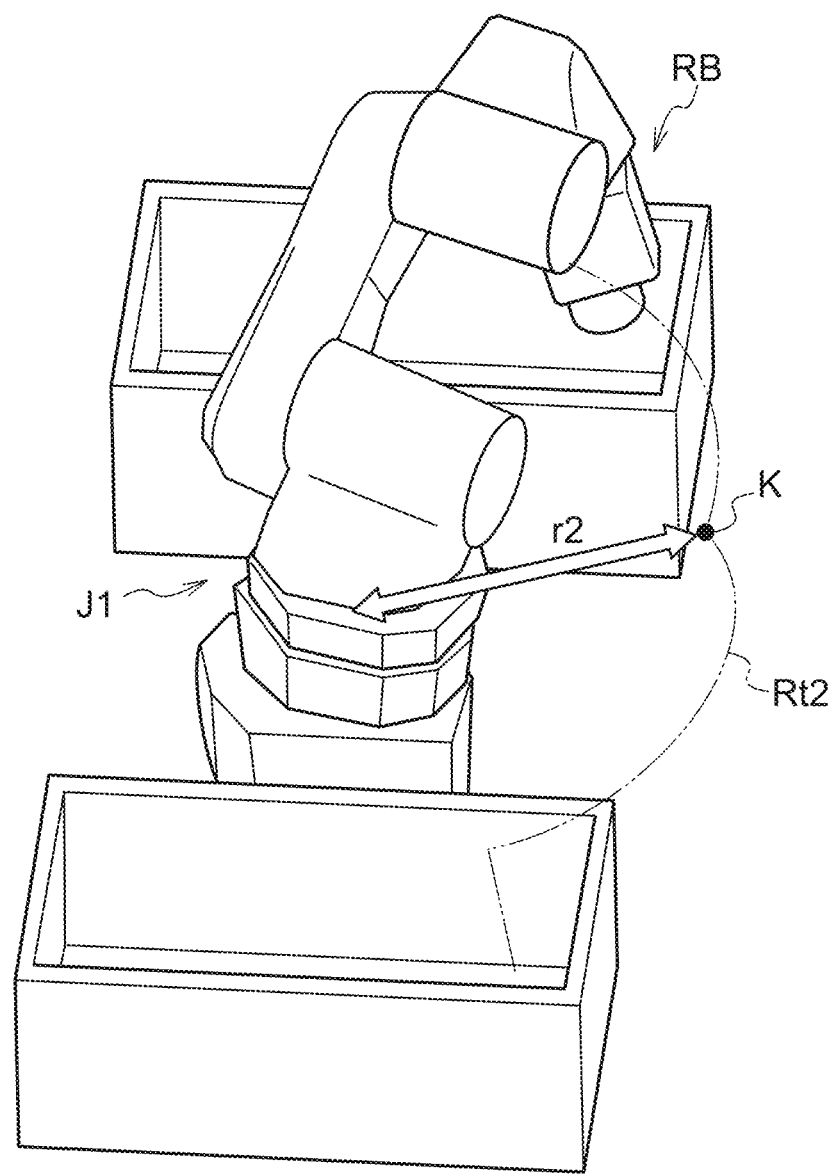
FIG. 15 is a diagram to explain a path in a case in which a waypoint has been added.

The CPU 11 functions as the correction unit 26 to correct the path of the robot RB so as to make the inertia smaller in the inertia reducible segment based on the path information, speed information, and specification information (step S108). Namely, a waypoint is added to the path of the robot RB. The waypoint is set at a position such that the inertia of the respective shafts of the robot RB is smaller. For example, a waypoint is set at a position where the rotation angle of a joint on the base side might conceivably contribute to reducing inertia, namely at a position where a rotation angle of the joint J2 and another joint such as the joint J3 connected to the joint J2 is a smaller rotation angle than the rotation angle expressed by the path information acquired at step S100, i.e. at a position causing the joints J2, J3 to perform an action to fold up the robot arm of the robot RB. For example, suppose a path through which the distal end of the robot arm passes in the original path information acquired at step S100 is the path Rt1 as illustrated in FIG. 14. In this case, as illustrated in FIG. 15, a waypoint K is set at a position where action of the joints J2, J3 is performed so as to fold up the robot arm. The action of the robot RB thus follows a path Rt2 passing through the waypoint K. A distance r2 from the center of the joint J1 to the distal end of the robot arm as illustrated in FIG. 15 becomes shorter than a distance r1 from the center of the joint J1 to the distal end of the robot arm as illustrated in FIG. 14. The inertia of the joint J1 is thereby reduced.

The CPU 11 functions as the computation unit 28 to compute the torque acting on each of the joints J1 to J6 based on the path information, speed information, and specification information. Specifically, the CPU 11 uses Equation (1) described earlier to compute as predicted load the torque acting on the joints J1 to J6 (step S110).

The CPU 11 functions as the computation unit 28 to determine whether or not the torque computed at step S110 satisfies the target torque (step S112). Specifically, the target torque is a value obtained by subtracting a prescribed margin from an upper limit value of the torque permitted for the joints J1 to J6.

Determination is made that the target torque has been satisfied (step S112: YES) in cases in which the torque on each of the joints J1 to J6 computed at step S110 is the target torque or lower for all joints, and processing transitions to step S114. On the other hand, processing returns to step S108 to correct the path in cases in which the torque on at least one of the joints J1 to J6 computed at step S110 exceeds the target torque (step S112: NO). Namely, the path is corrected by setting a different waypoint. Specifically, for example, the path is corrected by setting as a waypoint a position where action of the joints J2, J3 is performed so as to further fold up the robot arm of the robot RB. The processing of steps S108 to S112 is then repeated until the torque on each of the joints J1 to J6 is the target torque or lower. Note that the present routine may be ended in cases in which the torque on each of the joints J1 to J6 has still not been reduced to the target torque or lower for all the joints even after executing path correction a predetermined number of times.

The CPU 11 functions as the adjustment unit 30 to adjust a control amount for controlling acceleration of at least one joint out of the joints J1 to J6 of the robot RB, for example the joint J1 (step S114). This adjustment of acceleration is performed in order to bring the torque on the joint J1 as close as possible to the target torque while not prolonging the action time of the joint J1. Accordingly, initially the acceleration is increased in order to achieve a smaller difference between the torque computed at step S110 and the target torque.

The CPU 11 functions as the adjustment unit 30 to re-compute the torque on the joint J1 using the acceleration adjusted at step S114 (step S116). Since this torque computation processing is the same as the computation processing of step S110, explanation thereof is omitted. There is a commensurate increase in the torque on the joint J1 as the acceleration is increased.

Accordingly, the CPU 11 functions as the adjustment unit 30 to determine whether or not the torque on each of the joints computed at step S116 satisfies the target torque (step S118). Since the determination processing as to whether or not the target torque has been satisfied is the same as the determination processing at step S112, explanation thereof is omitted.

Processing transitions to step S120 in cases in which the torque on each of the joints satisfies the target torque for all joints (step S118: YES). On the other hand, processing returns to step S114 in cases in which at least one torque does not satisfy the target torque out of the torques for each of the joints (step S118: NO), and the control amount is adjusted so as to re-control the acceleration. Namely, the acceleration is made smaller by a predetermined value so as to make the torque smaller.

This enables the torque of the joint J1 to be set to a value as close as possible to the target torque while not prolonging the action time of the joint J1.

The CPU 11 functions as the adjustment unit 30 so as to output the path information and the speed information to the robot RB (step S120). Namely, in cases in which the path has been corrected and the acceleration has been adjusted, the corrected path information and the speed information for which the acceleration has been adjusted are output to the robot RB. On the other hand, in cases in which the path has not been corrected, the original path information and speed information acquired at step S100 are output to the robot RB. The robot RB accordingly performs an action following the path information and speed information.

As described above, the robot control device 10 of the first exemplary embodiment determines an inertia reducible segment where a shorter action time of the robot RB can be achieved even though a waypoint is added on the path. The control amount for controlling the acceleration is then adjusted so as to shorten the action time while the torque on the joints satisfies the target torque in the thus determined inertia reducible segment. This enables the acceleration of a robot to be appropriately adjusted so as to achieve high speed actions of the robot, irrespective of the skill level of the user, thereby enabling the burden on the user to be reduced. Moreover, since inertia can be reduced, the torque on the joints can be smaller, enabling the robot RB perform actions with less energy.

Second Exemplary Embodiment

Next, explanation follows regarding a second exemplary embodiment. In the second exemplary embodiment, a path is corrected while taking into consideration interference between the robot RB and obstacles. Note that portions the same as those of the first exemplary embodiment are appended with the same reference numerals, and detailed explanation thereof is omitted.

Figure 16:
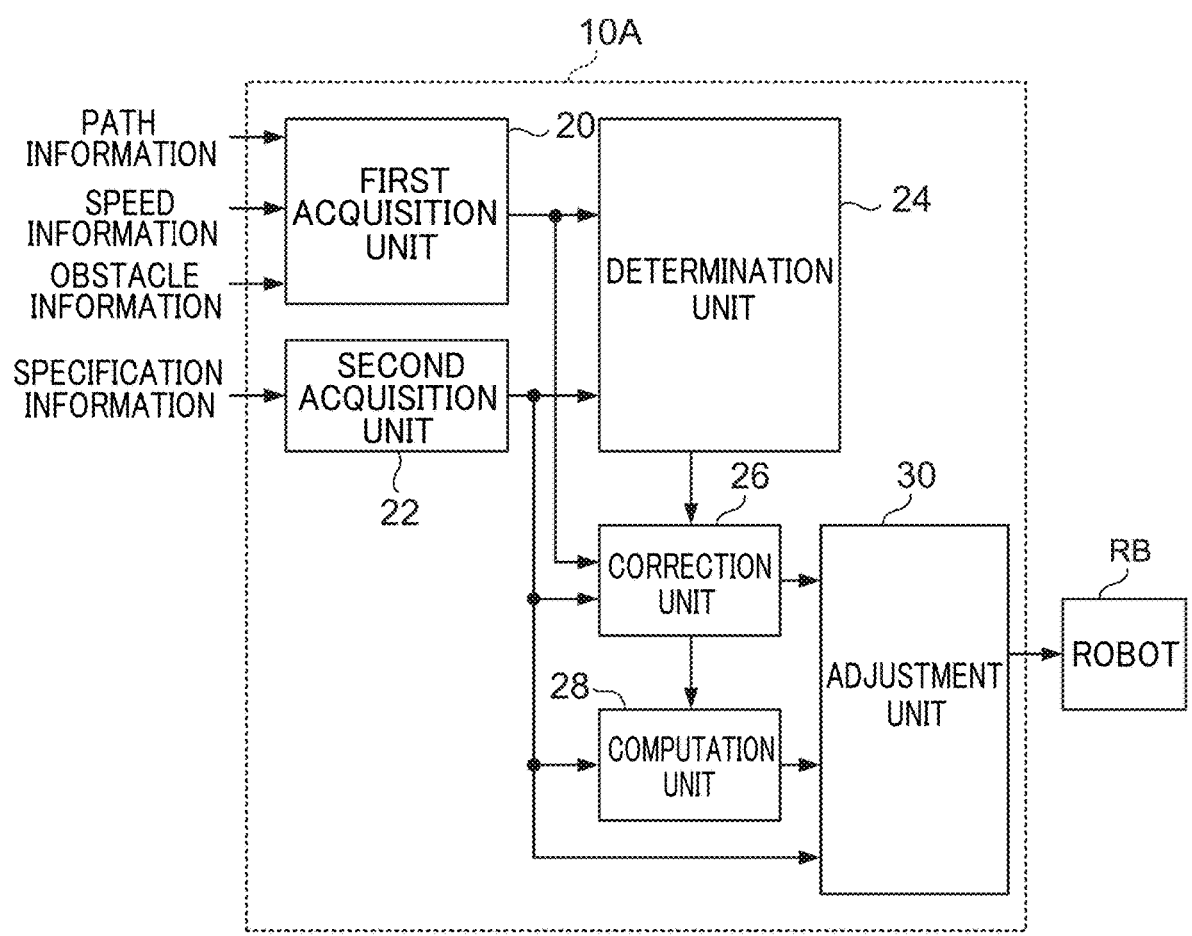
FIG. 16 is a block diagram illustrating an example of a functional configuration of a robot control device according to a second exemplary embodiment.

FIG. 16 is a functional configuration diagram of a robot control device 10A according to the second exemplary embodiment. As illustrated in FIG. 16, in the robot control device 10A, the first acquisition unit 20 is configured to acquire obstacle information. Moreover, the determination unit 24 is configured to determine whether or not a corrected path would interfere with an obstacle based on the obstacle information acquired by the first acquisition unit 20.

Next, explanation follows regarding operation of the robot control device 10A.

Figure 17:
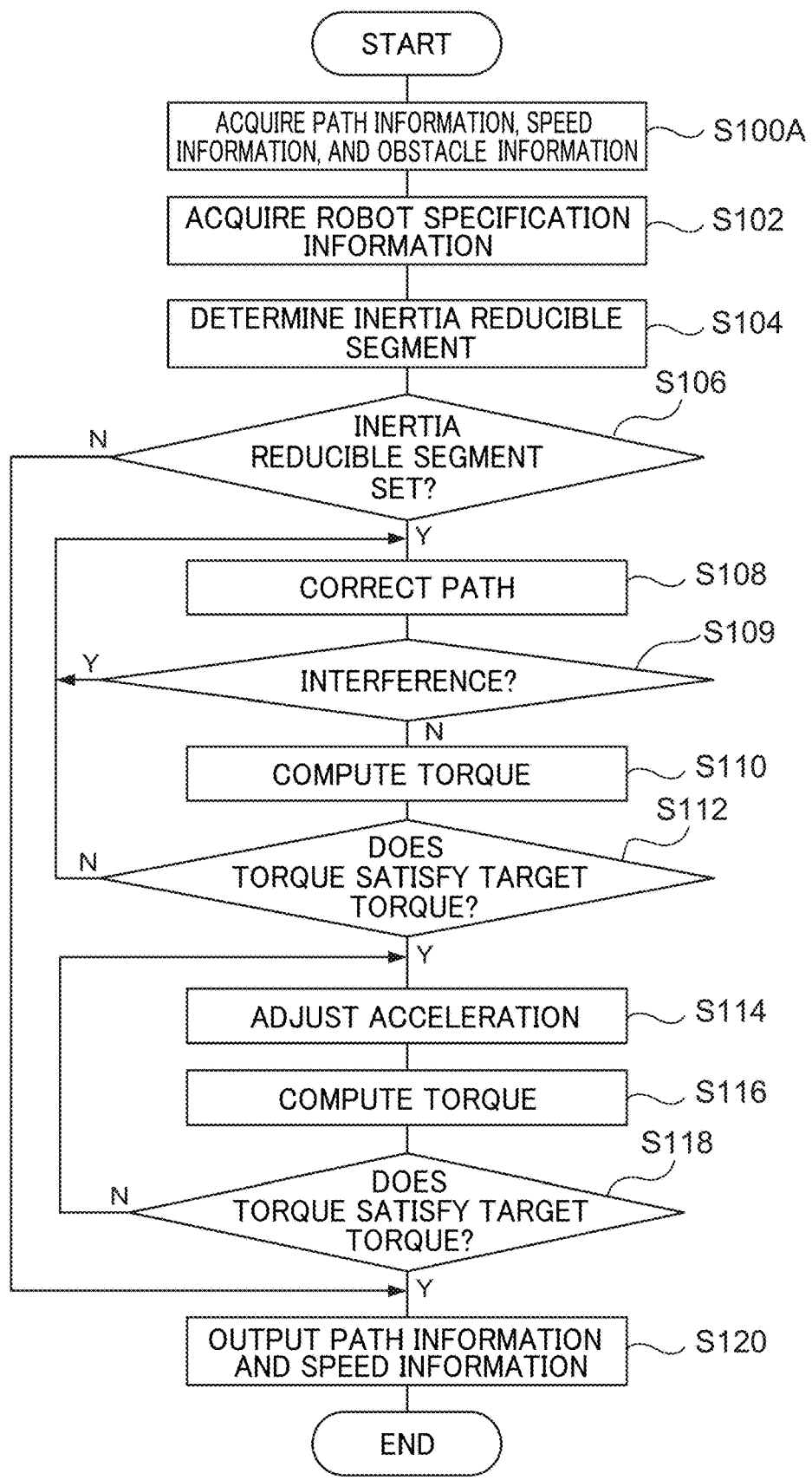
FIG. 17 is a flowchart illustrating a flow of robot control processing by a robot control device according to the second exemplary embodiment.

FIG. 17 is a flowchart illustrating a flow of robot control processing by the robot control device 10A.

The robot control processing illustrated in FIG. 17 differs by way of the processing of steps S100A and S109 from the robot control processing illustrated in FIG. 8. The processing of other steps is the same as that of the robot control processing illustrated in FIG. 8, and so explanation thereof is omitted.

The CPU 11 functions as the first acquisition unit 20 to acquire obstacle information in addition to the path information and the speed information (step S100A). An obstacle is a structural object that might obstruct an action of the robot RB. For example, in cases in which the robot control device 10A is applied to a pick-and-place device, the obstacle may be a box containing a workpiece, a shelf, or the like. The obstacle information is obtained as coordinate data or the like expressing the three-dimensional shape and position of the obstacle.

The CPU 11 functions as the determination unit 24 to determine whether or not the robot RB would interfere with the obstacle on the path corrected at step S108 (step S109). "Interference" refers to contact between the robot and the obstacle. The interference determination may, for example, employ known interference determination technology for determining interference between the robot RB and the obstacle. An example of such known interference determination technology is the technology described in Japanese Patent Application Laid-Open (JP-A) No. 2002-273675 and this may be employed.

Processing transitions to step S110 in cases in which there would not be interference between the robot RB and the obstacle on the path corrected at step S108 (step S109: NO). On the other hand, processing transitions to step S108 in cases in which there would be interference between the robot RB and the obstacle (step S109: YES), and the path is re-corrected. The path correction continues until interference between the robot RB and the obstacle is eliminated.

In this manner, in the present exemplary embodiment the obstacle information is acquired and determination is made as to whether or not there the robot RB would interfere with the obstacle, and for case in which interfere with the obstacle is determined, the path is corrected until the interference with the obstacle is eliminated. This enables the robot RB to be prevented from interfering with an obstacle on the corrected path.

Third Exemplary Embodiment

Next, explanation follows regarding a third exemplary embodiment. In the third exemplary embodiment, a path is corrected while taking into consideration interference between the robot RB and an obstacle. Note that portions the same as those of the above exemplary embodiments are appended with the same reference numerals, and detailed explanation thereof is omitted.

Figure 18:
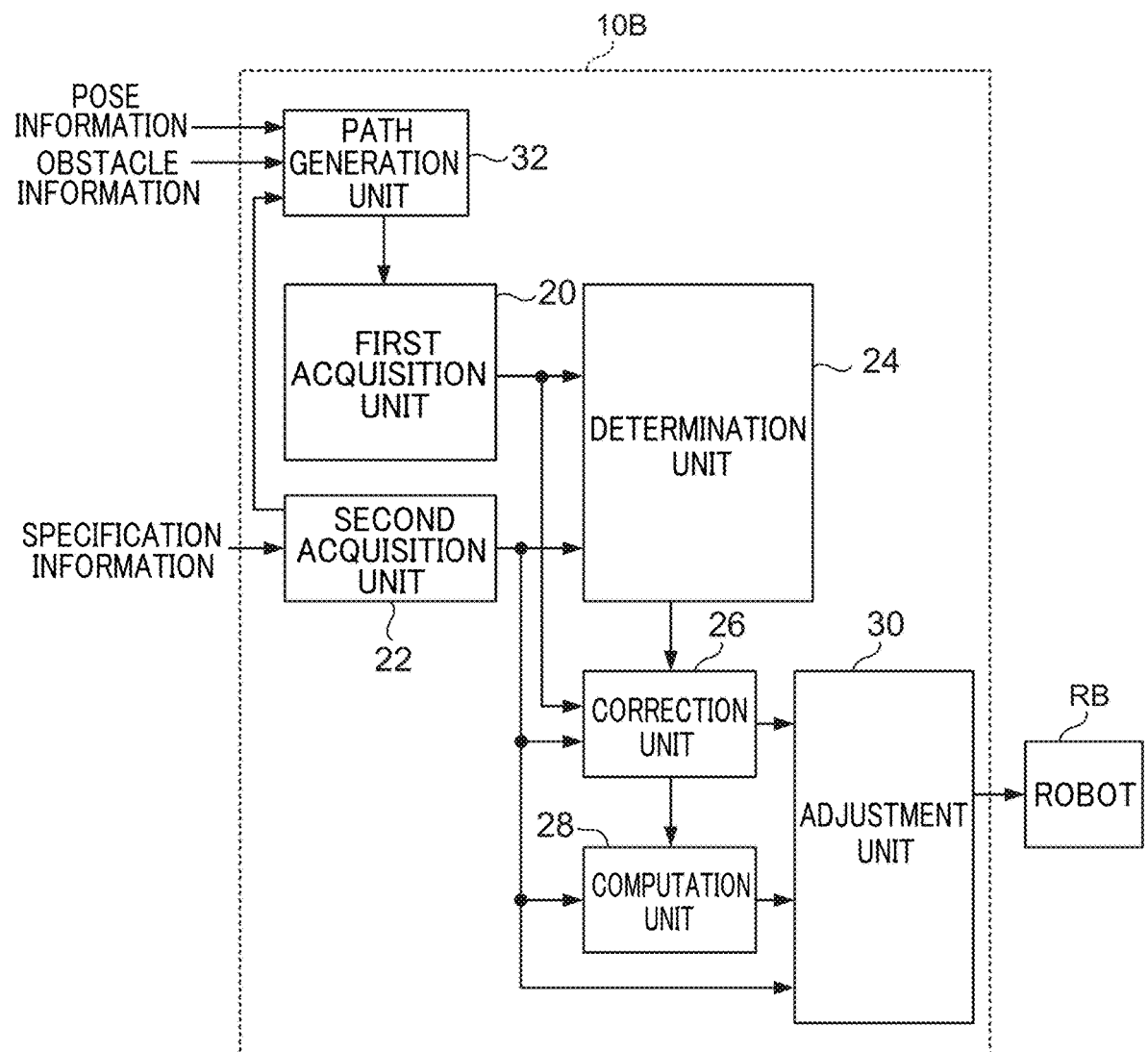
FIG. 18 is a block diagram illustrating an example of a functional configuration of a robot control device according to a third exemplary embodiment.

FIG. 18 is a functional configuration diagram of a robot control device 10B according to the third exemplary embodiment. As illustrated in FIG. 18, the robot control device 10B further includes a path generation unit 32.

The path generation unit 32 acquires pose information relating to an initial pose and a target pose of the robot RB, as well as obstacle information relating to an obstacle. The path generation unit 32 also acquires specification information of the robot RB. Moreover, the path generation unit 32 generates path information and speed information for the robot RB based on the acquired pose information, obstacle information, and specification information. The path generation unit 32 then outputs the generated path information and speed information to the first acquisition unit 20.

Next, explanation follows regarding operation of the robot control device 10B.

Figure 19:
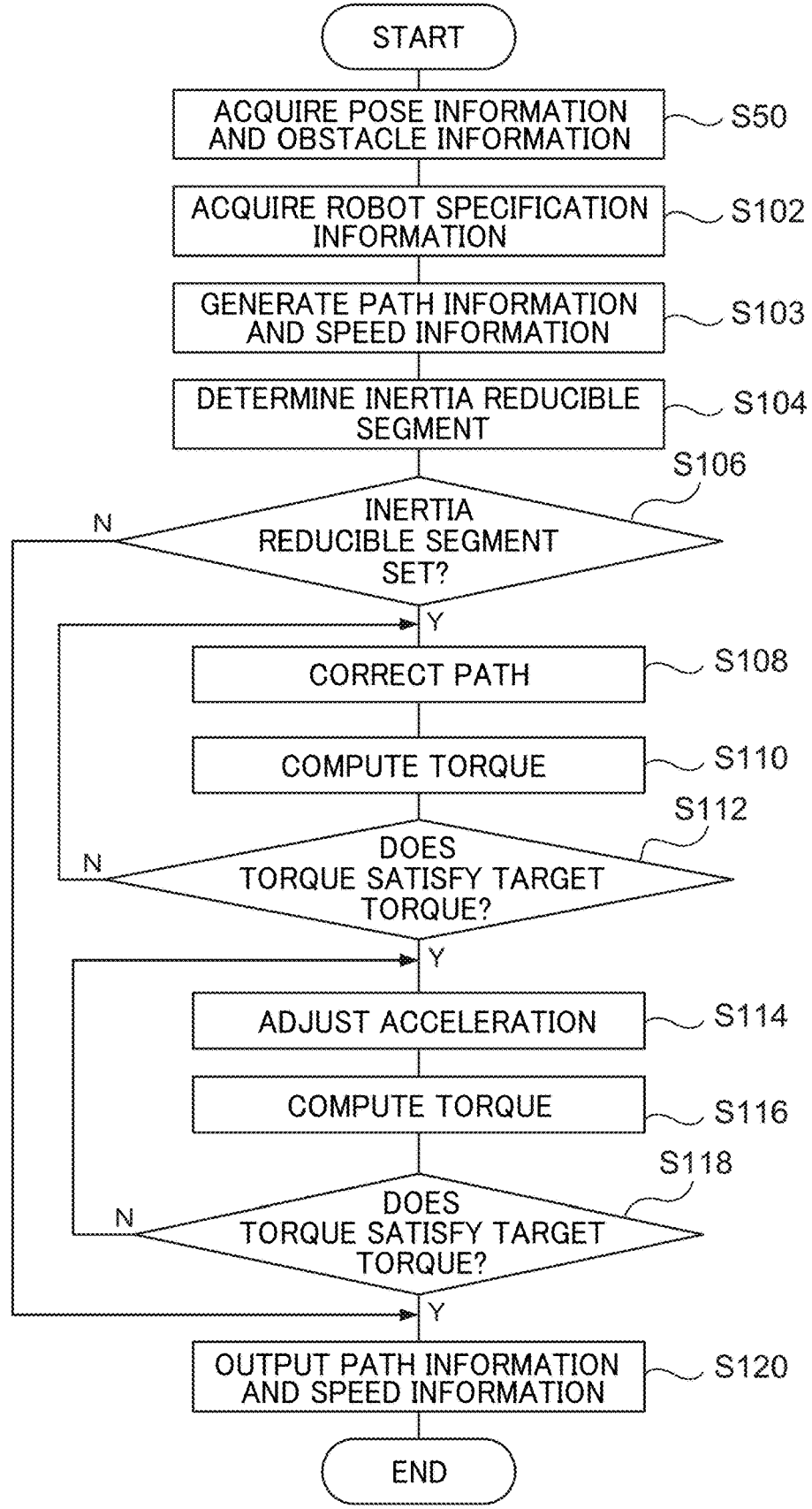
FIG. 19 is a flowchart illustrating a flow of robot control processing by a robot control device according to the third exemplary embodiment.

FIG. 19 is a flowchart illustrating a flow of robot control processing of the robot control device 10B.

The robot control processing illustrated in FIG. 19 differs by way of the processing of steps S50 and S103 from the robot control processing illustrated in FIG. 8. The processing of other steps is the same as in the robot control processing illustrated in FIG. 8, and so explanation thereof is omitted.

The CPU 11 functions as the first acquisition unit 20 to acquire the pose information and the obstacle information (step S50).

The CPU 11 functions as the path generation unit 32 to generate path information and speed information for a path on which the robot RB does not interfere with an obstacle based on the pose information and the obstacle information acquired at step S50 and also on the specification information acquired at step S102 (step S103).

Various known methods may be applied as a path generation method. Examples of methods that may be applied as the path generation method include a rapidly exploring random tree (RRT), RRT*, this being an improved version of RRT, RRT connect, a probabilistic roadmap method (PRM), stochastic trajectory optimization for motion planning (STOMP), covariant Hamiltonian optimization for motion planning (CHOMP), an exploring/exploiting tree (EET), or the like may.

Due to provision of the path generation unit 32 to generate the path of the robot RB, the present exemplary embodiment does not require the path information and speed information to be generated in advance.

Note that although explanation has been given regarding cases in which an inertia reducible segment is determined for the joint J1 in the exemplary embodiments described above, inertia reducible segments may be determined for other joints.

Moreover, although explanation has been given regarding cases in which a single waypoint is added in determination of an inertia reducible segment in the exemplary embodiments described above, plural waypoints may be added. In such cases, the speed profile for each segment divided by the plural waypoints may be combined, and a combined profile resulting from this combination may be used to determine whether or not it is an inertia reducible segment.

Moreover, although explanation has been given in the exemplary embodiments above regarding cases in which the robot RB subjected to control by the robot control device is an actual device, the control subject of the robot control device may be a robot performing an action in a simulation.

The robot control processing executed by the CPU reading software (a program) in the exemplary embodiments described above may be executed by various types of processor other than the CPU. Such processors include programmable logic devices (PLD) that allow circuit configuration to be modified post-manufacture, such as a field-programmable gate array (FPGA), and dedicated electric circuits, these being processors including a circuit configuration custom-designed to execute specific processing, such as an application specific integrated circuit (ASIC). The robot control processing may be executed by any one of these various types of processor, or by a combination of two or more of the same type or different types of processor (such as plural FPGAs, or a combination of a CPU and an FPGA). The hardware structure of these various types of processors is more specifically an electric circuit combining circuit elements such as semiconductor elements.

Moreover, although the robot control program is pre-stored (pre-installed) in the storage 14 or the ROM 12 in the exemplary embodiments described above, there is no limitation thereto. This program may be provided in a format recorded on a recording medium such as compact disc read only memory (CD-ROM), digital versatile disc read only memory (DVD-ROM), or universal serial bus (USB) memory. Alternatively, the program may be provided in a format downloadable from an external device over a network.

EXPLANATION OF THE REFERENCE NUMERALS 10, 10A, 10B robot control device
20 first acquisition unit
22 second acquisition unit
24 determination unit
26 correction unit
28 computation unit
30 adjustment unit
32 path generation unit
RB robot

The invention claimed is:

1. A robot control device, comprising:
a first acquisition unit that acquires path information relating to a path of a robot and speed information relating to a speed at which the robot moves on the path;
a second acquisition unit that acquires specification information relating to a specification of the robot;
a determination unit that determines a segment at which an action time of the robot is shortened, whether or not a waypoint is added on the path, based on the path information, the speed information, and the specification information;
a correction unit that corrects the path of the robot so as to reduce an inertia of the robot in a segment at which an action time of the robot is shortened, based on the path information, the speed information, and the specification information;
a computation unit that computes a load acting on a joint of the robot on a corrected path based on the path information, the speed information, and the specification information; and
an adjustment unit that adjusts a control amount for controlling an acceleration of the robot joint such that the load computed by the computation unit satisfies a target load,
wherein the determination unit compares a first action time of the robot, computed from a speed profile expressed by the speed information, against a second action time of the robot, computed from a combined profile resulting from combining speed profiles expressed by speed information of respective segments formed by dividing the path by adding a waypoint, and determines the path to be a segment giving rise to shorter action times of the robot in a case in which the second action time is shorter than the first action time,
the determination unit determines, for a segment determined to have a shorter action time of the robot, whether or not a segment for which the path is correctable is included,
wherein the path is divided into a first segment until a workpiece is gripped, a second segment in which the gripped workpiece is carried to a placement location and a third segment in which the gripped workpiece is placed, the second segment being the segment in which the path can be corrected, wherein the correction unit corrects the path only for segments determined to be segments for which the path is correctable, namely the second segment, wherein the correction unit is configured to add a waypoint to the path of the robot at a position such that the inertia of the respective shafts of the robot is reduced.

2. The robot control device of claim 1, wherein:
the first acquisition unit acquires obstacle information relating to an obstacle;
the determination unit determines whether or not the robot will interfere with the obstacle based on the obstacle information; and
in a case in which a determination has been made that the robot will interfere with the obstacle, the correction unit re-corrects the robot path such that the robot will not interfere with the obstacle.

3. The robot control device of claim 1, further comprising a path generation unit configured to:
acquire pose information relating to an initial pose and a target pose of the robot and obstacle information relating to an obstacle, and
generate the path information and the speed information based on the pose information, the obstacle information, and the specification information that have been acquired.

4. A robot control method in which a computer executes processing, the processing comprising:
a first acquisition process of acquiring path information relating to a path of a robot and speed information relating to a speed of the robot moving on the path;
a second acquisition process of acquiring specification information relating to a specification of the robot;
a determination process of determining a segment at which an action time of the robot is shortened, whether or not a waypoint is added on the path, based on the path information, the speed information, and the specification information, wherein the determination unit compares a first action time of the robot, computed from a speed profile expressed by the speed information, against a second action time of the robot, computed from a combined profile resulting from combining speed profiles expressed by speed information of respective segments formed by dividing the path by adding a waypoint, and determines the path to be a segment giving rise to shorter action times of the robot in a case in which the second action time is shorter than the first action time, the determination unit determines, for a segment determined to have a shorter action time of the robot, whether or not a segment for which the path is correctable is included, wherein the path is divided into a first segment until a workpiece is gripped, a second segment in which the gripped workpiece is carried to a placement location and a third segment in which the gripped workpiece is placed, the second segment being the segment in which the path can be corrected;
a correction process of correcting the path of the robot so as to reduce an inertia of the robot in a segment at which an action time of the robot is shortened based on the path information, the speed information, and the specification information, wherein the correction unit corrects the path only for segments determined to be segments for which the path is correctable, namely the second segment, wherein the correction unit is configured to add a waypoint to the path of the robot at a position such that the inertia of the respective shafts of the robot is reduced;
a computation process of computing a load acting on a joint of the robot on a corrected path based on the path information, the speed information, and the specification information; and
an adjustment process of adjusting a control amount for controlling an acceleration of the robot joint such that the load computed by the computation process satisfies a target load.

5. A non-transitory recording medium storing a robot control program that is executable by a computer to perform processing, the processing comprising:
a first acquisition unit that acquires path information relating to a path of a robot and speed information relating to a speed at which the robot moves on the path;
a second acquisition unit that acquires specification information relating to a specification of the robot;
a determination process of determining a segment at which an action time of the robot is shortened, whether or not a waypoint is added on the path, based on the path information, the speed information, and the specification information, wherein the determination unit compares a first action time of the robot, computed from a speed profile expressed by the speed information, against a second action time of the robot, computed from a combined profile resulting from combining speed profiles expressed by speed information of respective segments formed by dividing the path by adding a waypoint, and determines the path to be a segment giving rise to shorter action times of the robot in a case in which the second action time is shorter than the first action time, the determination unit determines, for a segment determined to have a shorter action time of the robot, whether or not a segment for which the path is correctable is included, wherein the path is divided into a first segment until a workpiece is gripped, a second segment in which the gripped workpiece is carried to a placement location and a third segment in which the gripped workpiece is placed, the second segment being the segment in which the path can be corrected;
a correction process of correcting the path of the robot so as to reduce an inertia of the robot in a segment at which an action time of the robot is shortened based on the path information, the speed information, and the specification information, wherein the correction unit corrects the path only for segments determined to be segments for which the path is correctable, namely the second segment, wherein the correction unit is configured to add a waypoint to the path of the robot at a position such that the inertia of the respective shafts of the robot is reduced;
a computation unit configured to compute a load acting on a joint of the robot on a corrected path based on the path information, the speed information, and the specification information; and
an adjustment unit configured to adjust a control amount for controlling an acceleration of the robot joint such that the load computed by the computation unit satisfies a target load.

* * * * *